Nov. 11, 1952             G. J. TABER             2,617,398
FUME ELIMINATOR AND FUEL SAVER FOR INTERNAL-COMBUSTION ENGINES
Filed March 9, 1950             3 Sheets-Sheet 1
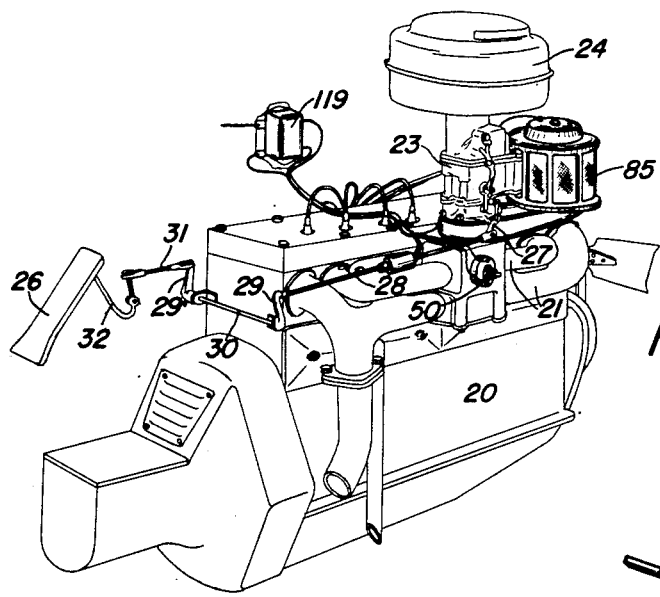
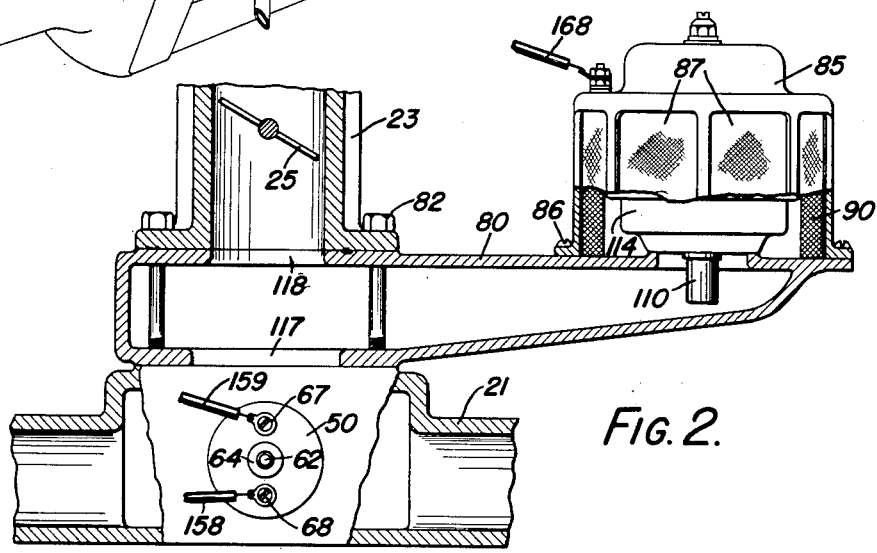
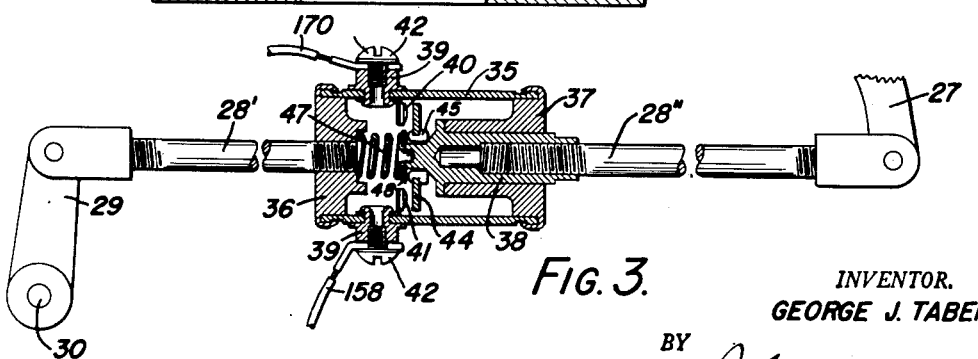
INVENTOR.
GEORGE J. TABER
BY
ATTORNEY Nov. 11, 1952 G. J. TABER 2,617,398
FUME ELIMINATOR AND FUEL SAVER FOR INTERNAL-COMBUSTION ENGINES
Filed March 9, 1950 3 Sheets-Sheet 2

INVENTOR.
GEORGE J. TABER
BY
ATTORNEY

Nov. 11, 1952 G. J. TABER 2,617,398
FUME ELIMINATOR AND FUEL SAVER FOR INTERNAL-COMBUSTION ENGINES
Filed March 9, 1950 3 Sheets-Sheet 3

INVENTOR.
GEORGE J. TABER
BY
ATTORNEY

Patented Nov. 11, 1952

2,617,398

UNITED STATES PATENT OFFICE 2,617,398

FUME ELIMINATOR AND FUEL SAVER FOR INTERNAL-COMBUSTION ENGINES

George J. Taber, Buffalo, N. Y.

Application March 9, 1950, Serial No. 148,637

20 Claims. (Cl. 123—124)

The present invention relates to devices for use on internal combustion engines for the purpose of correcting inherent operational faults. More particularly, the invention relates to devices which are intended for use on automotive vehicles for eliminating fumes, saving fuel and lubricating oil, and improving the service life and performance of the engine.

The internal combustion engine of an automotive vehicle alternately supplies power to drive the vehicle and is driven by the vehicle's momentum. The internal combustion engine is designed primarily, however, to produce power, not to absorb it. As is well known, when an internal combustion engine is being driven by the momentum of a vehicle and is operating at greater than idling speed with its throttle closed, as is the case when the vehicle is slowing down or is coasting, fuel is being wasted, lubricating oil is being wasted, and harmful fumes and gases are generated. The wasted fuel is pulled through the low speed or idling jets of the carburetor; and the lubricating oil provided for the engine is pulled through, or past, the intake manifold or passed into the combustion chambers, for the driven engine acts primarily as a pump, and reduces the pressure within the intake manifold and combustion chambers excessively. Furthermore, as the lubricating oil is pumped past the valve guides and pistons, air is also displaced, and the pressure within the oil sump area is also reduced. The reduction of pressure in the oil sump area causes moisture-laden atmosphere air and abrasive dusts to be drawn into the oil sump by means of the normally supplied sump vents. The oil sump is chilled by the intaken air and condensate results; the admitted abrasives further contaminate the oil. Thus it too becomes sludged, and accelerates engine wear. The power absorption periods preclude the combustion of the wasted fuel and oil. The improper combustion of the fuel results not only in the formation of gases, which are not only injurious to health and obnoxious to the sense of smell, but, if sulfur is present in the fuel or oil, are harmful to the engine itself. The combustion failure causes an irregular exhaust pattern of the engine as the vehicle speed is reduced, and is itself the result of the starved engine displacement. The wasted fuel and oil are, moreover, mixed within the engine and partially distilled by local hot spots within the engine so that some gases and some solids are formed which are passed or circulated through the engine and which coat all the exposed parts, such as valve stems, cylinder walls, combustion chamber, intake and exhaust manifolds, exhaust pipe and muffler, with an aciduous, corrosive coating, causing sticking valves and piston rings, carbon formation, fouled spark plugs, and rusted and plugged mufflers. The mixture is finally passed out into the city streets, and is a cause of resentment to pedestrians, and to autoists following a bus, and is detrimental to public health and to good public relations.

In order to eliminate the fumes and to save gas, various devices have been proposed in the past incorporating an automatically operating valve on the intake manifold of an internal combustion engine which will open automatically when the accelerator, and hence the carburetor throttle, is moved toward idling position, and the vehicle is driving the engine at a speed greater than that corresponding to the position of the throttle. With such an arrangement the carburetor throttle may be by-passed when the engine is being driven by the momentum of the vehicle, and fresh air only may be drawn into the combustion chambers of the engine through the open valve, thereby eliminating waste of fuel and formation of noxious gases and fumes.

Such systems as have heretobefore been devised for this purpose, however, are either too sensitive in operation, causing a full power on, full power off operating cycle, which interferes with smooth operation of the vehicle, or they do not permit the broad operating range which is required for successful operation, or they are unable to supply free atmospheric air in quantities which will relieve the engine's displacement or provide proper scavenging air velocities, or are costly in construction not easily adapted to general use, or cause an undesirable vehicle acceleration when they become operative.

One object of the present invention is to provide an improved device of this type which will permit unrestricted passage of air into the combustion chambers of an internal combustion engine, whenever the engine is being driven by the momentum of the vehicle at greater than idling speed, and which will operate to completely destroy under these conditions the intake manifold vacuum, prevent flow of fuel to the engine, and convert the engine into a compressor. As long as the engine is driven by vehicle momentum, then, air will be compressed and exhausted, and abrasive dusts and moisture-laden air will be prevented from being drawn into the crankcase or oil sump to contaminate the lubricating oil.

Another object of the invention is to provide apparatus of the character described which is primarily controlled by and is caused to become operable under the influence of the partial vacuum existing within the intake manifold of a decelerating and power-absorbing internal combustion engine.

Another object of this invention is to provide apparatus of the character described which employs an electro-vacuum assist mechanism which coacts with electro-magnetically operated parts to assist and cause the opening of a valve through which the partial vacuum created in the intake manifold may influence the action of the valve that by-passes air around the carburetor throttle.

A further object of this invention is to provide apparatus of the character described which is maintained in an operable, or active air by-passing, state by the combined influences of the partial vacuum within the intake manifold, the prime source of electrical energy for the engine, and the partial vacuum induced by in-rush of air by-passing the carburetor throttle.

A further object of this invention is to provide apparatus of the character described which is rendered active, so that air may be by-passed into the engine, by the combination of an electrically induced magnetic field, an elecro-magnetically responsive valve mechanism, a movable member which reacts to changing pressures, or partial vacuum and which controls another movable member that reacts to conditions of changing pressures and that is movable to by-pass the carburetor throttle and pass air into the intake manifold of the engine.

A further object of this invention is to provide apparatus of the character described which will supply free atmospheric air directly to the intake manifold of an internal combustion engine in by-pass of the engine's carburetor throttle and in such quantities, and at such velocities that the in-rushing air can scavenge any accumulation of waste fuel or lubricating oil within the intake manifold or the combustion chambers of the engine, and can cause the accumulation to be cleared out of the engine and the exhaust system, thereby preventing formation of harmful fumes, gases and solids.

Another object of the invention is to provide apparatus of the character described which will operate without causing an undesired acceleration of the vehicle when the engine throttle is purposely closed to reduce vehicle speed.

Another object of the invention is to provide apparatus of the character described which can easily be installed.

Still another object of the invention is to provide apparatus of the character described which may easily be adjusted or calibrated to control the timing and latitude of its operation, and to regulate both the time when the apparatus becomes operative, and the time when it becomes inoperative so as to prevent stalling of the vehicle.

Another object of the invention is to provide apparatus of the character described which is automatically rendered inoperable when the speed of the engine is decreased to a certain predetermined limit.

Another object of the invention is to provide apparatus of the character described which is partially controlled, at least, through the medium of an electro-mechanical switch that is responsive to changing rate of electric impulse transmission, which is synchronous with the engine speed and which may be actuated through the primary circuit of the electrical ignition system of the vehicle.

Another object of the invention is to provide apparatus of the character described which is operative only when the engine is caused to absorb power and consequently which will have no effect on the engine when there is a demand for power. A further object of the invention is to provide apparatus of the character described which is so constructed that it will not function on a cold engine and will not prolong the engine warm up time.

Still further objects of the invention are to provide apparatus of the character described which will be quiet in operation, simple in construction, and extremely efficient.

Other objects of the invention will be apparent hereinafter from the specification and from the recital of the appended claims.

In the drawings:

Fig. 1 is a perspective view of an internal combustion engine showing a device constructed according to one embodiment of this invention installed thereon;

Fig. 2 is a fragmentary view on an enlarged scale showing, partly in section and partly in elevation, a portion of the intake manifold of the engine, a portion of the carburetor, the valve unit and air filter forming a part of the device of the present invention, and the support or adapter by means of which this unit is mounted between the intake manifold and the carburetor;

Fig. 3 is a sectional view of the detent switch of the mechanism and of the parts which are associated with this switch and which operate the same;

Figure 4:
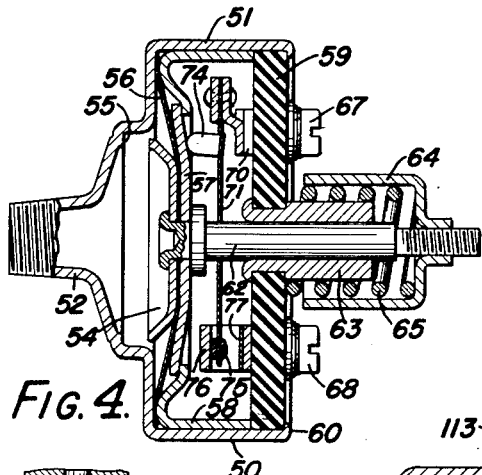
Fig. 4 is a sectional view of the vacuum switch of the mechanism.

Referring now to the drawings by numerals of reference, 20 denotes an internal combustion engine of conventional design, and 21 are the intake manifolds of this engine. 23 denotes a conventional carburetor, and 24 denotes a conventional air inlet strainer associated with this carburetor. 25 (Fig. 2) denotes the butterfly valve of the carburetor. This is adapted to be operated in conventional fashion from the accelerator pedal 26 of the vehicle through the leverage 27, link 28, lever arm 29, shaft 30, lever arm 29', link 31, and bell-crank lever 32, the last-named being connected to the accelerator pedal 26.

The mechanism for operating the butterfly valve 25 is of conventional design except that the rod 28 is made in parts 28' and 28" (Fig. 3) and has interposed between the two parts a detent switch. This detent switch comprises a cylindrical housing 35 which has end walls 36 and 37. The part 28' of rod 28 threads into end wall 36. Mounted in the other end wall 37 of this housing is a sleeve 38 into which the other section 28" of the rod 28 threads. The sleeve 38 is slidably reciprocable in the end wall 37 and is guided thereby. Secured at diametrically opposite points in the cylindrical housing 35 are the two terminal posts 39 to which are fastened the terminal contacts 40 and 41. Terminal screws 42 thread into the posts 39. The terminals 40 and 41 are adapted to be bridged by a plate 44 which is secured by means of an insulator sleeve 45 on the tubular member 38.

The detent switch is a normally open switch, being held open by a coil spring 47 which is interposed between the end wall 36 of the housing and a washer 48 that is secured to the head of the sleeve 38. This switch may be supplied in either pull or push types. The throttle-return spring pressure should cause this switch to close its circuit when the throttle is at idling position. In other words, the detent switch is adapted to close when the accelerator pedal is released and reaches idling position.

Mounted on the intake manifold or any suitable part of the engine is an initiator switch 50 (Figs. 1 and 4). This switch comprises a cupped housing 51 which has a tubular extension 52 at one end that is adapted to be threaded into the intake manifold of the engine. Mounted in the housing 51 is a disc diaphragm member 56 which is secured between a cup-shaped washer 54 and a clamping disc 57. The clamping disc 57 seats, in the shown position of the diaphragm, against the base portion of a cup-shaped member 58. The diaphragm is held at its outer edge between the member 58 and the left hand end wall of housing 51. The cup-shaped member 58 is held between diaphragm 56 and a rigid plate 59 made of a suitable insulating material that closes the open end of the housing 51. The end plate 59 is secured in position by the flange portion 60 of the housing. The washer 54, diaphragm 56, and clamping disc 57 are secured to the head of a bolt or rod 62 which is slidably mounted in a bushing 63 that is secured centrally in the end plate 59. The cup-shaped member 58 has a central hole in it through which the bolt 62 passes. Threaded onto the outer end of the bolt 62 is a cup-shaped cap 64; and interposed between this cap and the end-plate 59 is a coil spring 65.

Figure 5:
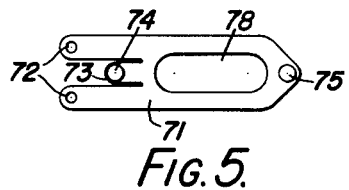
Fig. 5 is a view showing one of the parts of this vacuum switch.

Mounted in the end plate 59 are two electrical terminal posts 67 and 68. Riveted to a bracket 70 that is secured to the post 67 is a flexible arm 71 which is shaped as shown in Fig. 5. The bolt 62 passes through the slot 78 in this arm. This arm is formed with furcations 72 that are riveted to the bracket 70; and between these furcations it is formed with an intermediate tab 73 which is reversely bent and which has a button 74 secured to it. At its free end, the arm 71 carries a contact member 75. The button 74 is adapted to contact with the back of the clamping disc 57.

The coil spring 65 serves normally to hold the parts in the positions shown in Fig. 4. When the parts are in these positions, the plate 57, through its contact with button 74, flexes the arm 71 and holds the contact 75 in engagement with a stop 76 that is secured to the post 68. When the engine is being driven by the momentum of the vehicle, however, the suction generated pulls the diaphragm 56 to the left in Fig. 4 against the resistance of spring 65. The arm 71 is then left free to flex to its normal position bringing the contact 75 into engagement with the plate 77 that is secured to the post 68. The arm 71 which is an electrical conductor, thus bridges terminals 67 and 68 and makes an electric circuit between these posts or terminals 68 and 67.

The initiator switch is, therefore, a normally open switch which responds to change of intake manifold vacuum. Adjustment of this switch is achieved simply by turning the spring loaded cap 64. By adjusting this cap, the time when the valve mechanism of the present invention becomes operative may be controlled.

When the apparatus of the present invention is used, an adapter is secured between the intake manifold 21 and the carburetor 23. This adapter may be in the form of a hollow casing 80 (Fig. 2) which is secured in place by the bolts 82 that also serve to secure the carburetor in position.

Figure 6:
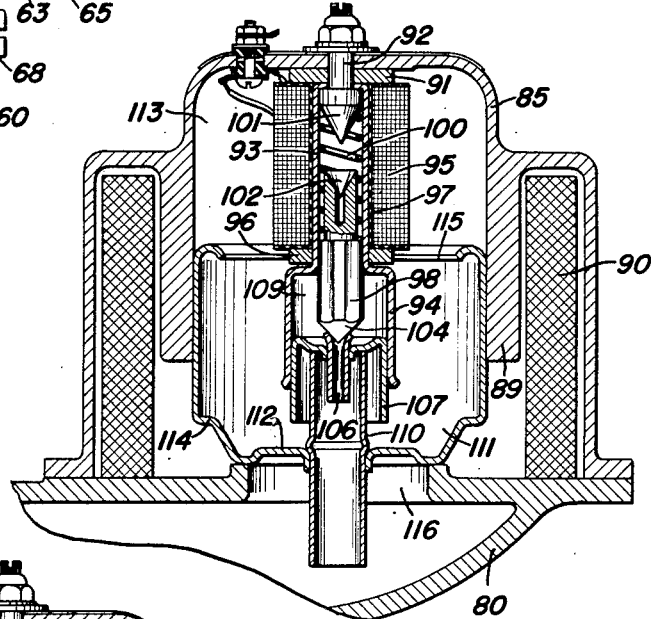
Fig. 6 is a vertical sectional view on an enlarged scale showing the valve mechanism and air filter of the present apparatus and the mounting of these parts, the several parts being shown in the positions they occupy when the engine is supplying power to the vehicle.

The casting 80 may be shaped, as shown, to extend to one side of the carburetor. Mounted upon its upper face at the extremity thereof is a combined filter and valve unit enclosed in a housing 85. This housing is secured to the casting by screws 86. The outside wall of this housing is provided with a plurality of large size vent openings 87 through which air may be admitted. Mounted between the outside wall of the housing and an inner wall 89 is a cylindrical air filter 90 (Fig. 6).

Figure 7:
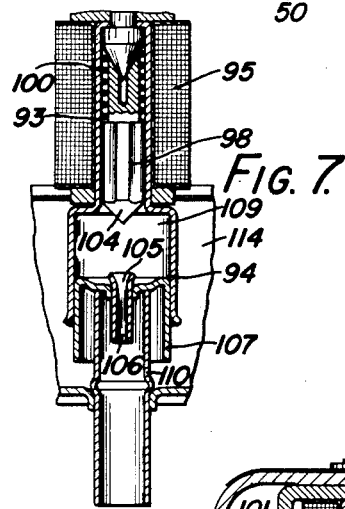
Fig. 7 is a fragmentary vertical sectional view showing some of the parts of Fig. 6 in the positions which they occupy at the first stage of operation of the valve mechanism after the solenoid is energized.
Figure 8:
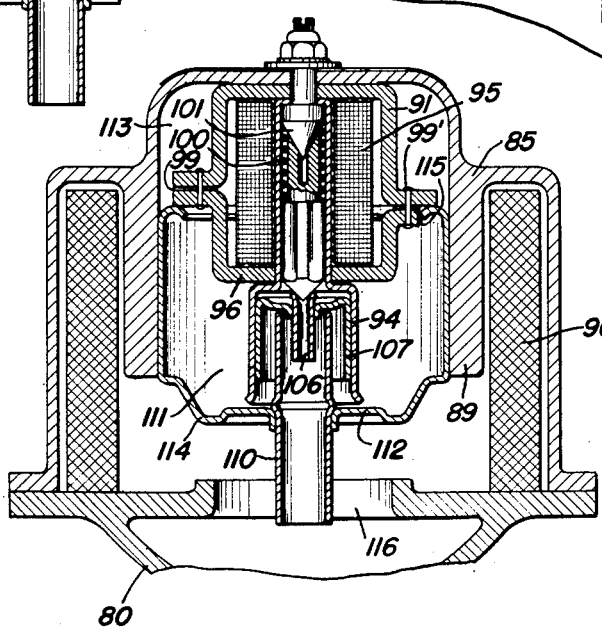
Fig. 8 is a further vertical sectional view showing the parts at the final stage in the operation of the valve mechanism, the section being taken at right angles to the section of Figs. 6 and 7.

Secured in the top of the housing 85 is the upper portion 91 (Fig. 6) of the solenoid outer magnetic member constituting one pole of the solenoid. This is secured to housing 85 by pole piece 92 which also serves to secure sleeve 93 to the housing. This sleeve is formed at its lower end with a cup-shaped portion 94 of enlarged diameter, as shown in Figs. 6, 7 and 8. Surrounding the smaller diameter portion of the sleeve and interposed between the member 91 and a magnetic member 96, which constitutes the opposite pole of the solenoid, is a solenoid coil 95. This coil is insulated from sleeve 93 by suitable insulation 97. The two members 91 and 96 have non-magnetic spacers 99 between them and are secured together by non-magnetic rivets 99'.

Mounted to reciprocate in the sleeve 93 is the armature 98 of the solenoid. The armature 98 is normally pressed downwardly by a coil spring 100 which is interposed between the head of the bolt 92 and the armature. The bolt 92 has a conical head 101 and the armature has a conical recess 102 to receive this head when the armature is moved vertically upwardly upon energization of the solenoid. The armature has a conical lower end 104 which acts as a valve and which seats in conically shaped seat 105 (Fig. 7) provided in the upper end of a tube 106 which is welded or otherwise secured to a cup-shaped servo-piston or valve 107.

This piston or valve is adapted to reciprocate in the cup-shaped portion 94 of the sleeve 93. When it is in its lower position it is adapted to rest upon the upper end of a Venturi-tube 110. This tube is outwardly crimped midway of its length and rests with air-tightness in an opening provided in the lower end wall 112 of a hollow piston-valve 114. This piston-valve is adapted to slide in the inner wall 89 of the housing 85 and is adapted to be guided therein. In its lower position it seats on adapter 80 and closes the port 116 in the upper face of this adapter. It has an enlarged opening 115 in its upper end wall so that it may be moved upwardly and pass over the solenoid coil 95.

When the solenoid 95 is energized, the armature 99 will be pulled upwardly against the resistance of the spring 100. When the solenoid plunger valve 98 is lifted, the tube 106 is opened. This unbalances the pressure on the servo-piston or valve 107, leaving it with a larger area exposed to air pressure at the bottom than at the top. Hence, as the upper chamber 109 (Fig. 7) of the servo-piston 107 is evacuated, the servo-piston will rise until it enters the magnetic field of the solenoid. Thereafter, as long as the solenoid is energized, it will be held magnetically in its upper position. The moment that the servo-piston leaves its seat on the Venturi-tube 110, the Venturi-tube is opened and consequently the upper chamber 113 in which the main piston valve 114 is adapted to slide is evacuated through the opening 115 in the main piston valve 114, causing this valve to rise since it is also unbalanced. This valve or piston is lifted until it is magnetically locked in its upper position by completing the magnetic path of the field surrounding the solenoid. This is done by contact of valve 114 around its periphery with laterally extended portions of members 91 and 96 whose lower faces lie in the same horizontal plane, see Fig. 8. Thereafter the piston valve 114 is held in its upper position until the governor, now to be described, breaks the solenoid circuit of its own accord, or until the impulse circuit to the governor is broken by the action of the detent switch when there is a demand for power and the accelerator throttle is advanced. When the valve 114 is opened, air can flow through the vents 87 in housing 85, filter 90, port 116, and adapter 80 into the intake manifold of the engine. Thus clean air will be sucked into the engine on its suction strokes during the time the engine is being driven by the momentum of the vehicle. The adapter 80 has a port 117 (Fig. 2) communicating with the intake manifold. It has also another port 118 with which the carburetor registers so that the carburetor may perform its function when the engine is driving the vehicle and valve 114 is closed.

The governor 119 (Figs. 1, 9 and 10) may be mounted at any suitable point on the vehicle as for instance the dashboard, being preferably secured adjacent to the voltage regulator. It may comprise two electromagnets 120 and 121 of conventional construction and two capacitors 122 and 123 also of conventional construction. These may all be mounted upon a common plate 124 which may be secured to the dashboard of this vehicle by screws passed through holes 126 and which, in turn, may be secured in any suitable fashion to a base 125 that is fastened to the back of the dashboard or other part of the vehicle by screws which are passed through holes 126 in the ears 127. Holes 128 are for attaching a suitable cover.

Secured to pivoted plates 130 and 131 above the two electromagnets 120 and 121 are the pairs of switch arms 132 and 133, and 134 and 135, respectively. The switch arms 132 and 133 are adapted to be held in upper position by a coil spring 137 which is secured to the base plate 124 at one end and which is secured at its opposite end to the end of an arm 138 that is fastened by a bolt 139 to the plate 130. Similarly, switch arms 134 and 135 are normally held open by a coil spring 141 which is secured at one end to the base 124 and at its opposite end to the tail of an arm 142 that is fastened to plate 131. A stop 143 may be provided to limit upward movement of plate 131. Switch arms 132, 133, 134 and 135 are adapted to make contact with terminals carried by plates 144, 145, 146 and 147, respectively. The structure is conventional and need not further be described.

Figure 11:
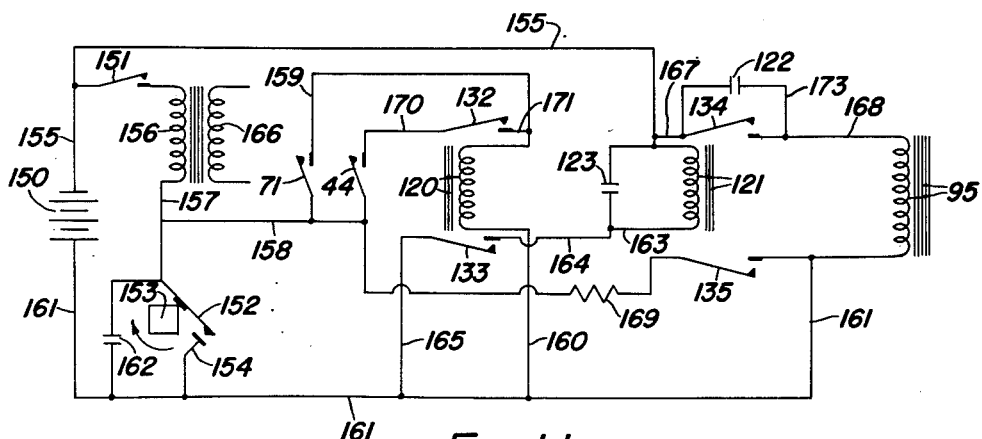
Fig. 11 is an electrical diagram showing one way in which the parts of the apparatus may be wired to perform their function.

One way in which the apparatus may be wired electrically to perform its function is illustrated diagrammatically in Fig. 11. Here 150 denotes the battery of the automotive vehicle. 151 denotes the conventional ignition switch of the vehicle which is manually operated. 152 denotes the conventional make and break switch of the ignition system whose position is controlled in conventional manner by the conventional rotating cam 153. To start the car the switch 151 must be closed; and all the while the engine is running the cam 153 revolves to make and break contact alternately between the switch 152 and the line 154.

The ignition system, as such, forms no part of the present invention. A typical wiring diagram of this system is included in Fig. 11, however, since the make and break switch 152 partly controls operation of the apparatus of the present invention as will hereinafter be described. Closing of the switch 151 makes a circuit to the primary coil 156 of the ignition system from the battery 150 through line 155, switch 151, coil 156, line 157, switch 152, when cam 153 has been rotated to a position to permit switch 152 to close, line 154, and the ground, which is denoted diagrammatically by the line 161. Capacitor 162, which is connected with line 157 and the ground 161, serves in the usual fashion. The secondary coil of the ignition system is denoted at 166.

When the accelerator pedal 26 is released as above described, the detent switch 44 (Figs. 3 and 11) is closed. As soon as the vacuum has been built up to the desired degree after the momentum of the vehicle starts to drive the engine, the vacuum-operated switch 71 (Figs. 4 and 11) is closed by suction upon the diaphragm 56. Upon opening of breaker arm 152 in the operation of the ignition, a circuit is made from the battery 150 through the line 155, the closed ignition switch 151, the primary coil 156 of the ignition, lines 157 and 158, the now-closed vacuum switch 71, the line 159, the coil of the relay 120, and the lines 160 and 161 back to the battery.

Figure 9:
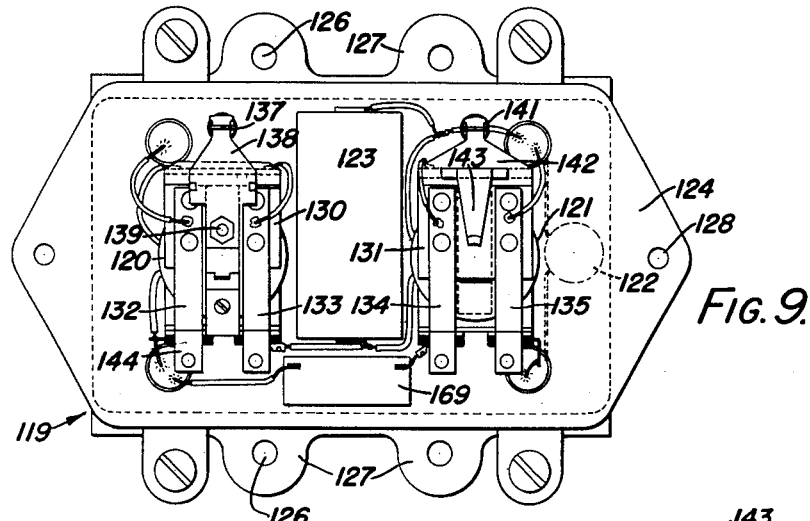
Fig. 9 is a plan view showing the electrical governor of the apparatus.
Figure 10:
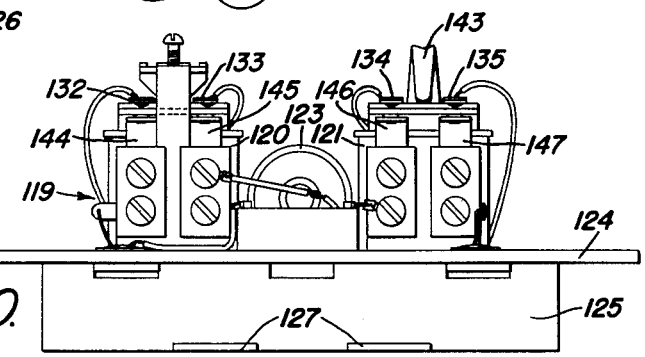
Fig. 10 is an elevation of this governor.

This energizes the relay 120 and causes it to close the switch arms 132 and 133 (Figs. 9, 10 and 11). The closing of these switch arms makes a circuit to the coil of relay 121, this circuit being from the battery 150 through line 155, the coil 121, the line 163, the line 164, the now-closed switch arm 133, the line 165 and ground 161 back to the battery. The energization of the relay 121 causes the switch arms 134 and 135 to be closed. This energizes solenoid 95, a circuit being made from the battery through the line 155, line 167, switch arm 134, line 168, solenoid 95, and ground 161 back to the battery. The solenoid 95 is thus energized to initiate the opening of the valves 107 and 111 (Figs. 6, 7 and 8) which permit air to flow into the intake manifold. The closing of the switch arm 135 makes a circuit to the resistor 169 which suppresses any spark because it allows sufficient current to flow through the primary coil 156 without the flow of current through the primary coil being interrupted by the opening and closing of breaker point 152. This eliminates cutting of the electrical lines of force which are necessary to produce a high voltage spark from secondary winding 169 of the ignition coil. This prevents an unwanted acceleration of the engine which would result if an accumulation of raw fuel in the intake manifold were carried into the combustion chambers by in-rush of by-passing air on opening of the valve 114, and if this fuel were ignited.

The vacuum switch 71 opens upon opening of valve 111 because the pressure of air flowing through port 116 and adapter 80 into the intake manifold destroys the vacuum that has previously caused switch arm 71 (Fig. 4) to be shifted, and the switch arm 71 is returned to the position shown in Fig. 4 by action of coil spring 65. Thereafter, as long as the apparatus is in operation, the circuit to the relay coil 120 must be maintained through the closed detent switch 44, the line 170, the now closed switch arm 132, the line 171, the coil 120, the line 160, and ground 161.

The circuit to coil 120 may be broken by stepping on accelerator pedal 26 (Fig. 1). This opens detent switch 44. The detent switch serves only the purpose of breaking the circuit when there is demand for power from the engine. It cannot in any way initiate any circuit.

The circuit to coil 120 is also broken when the vehicle slows down to a predetermined point which is adjustable and which is above the stalling point of the engine. As the car slows down, the speed of rotation of the cam 153 decreases. This means that the frequency of the impulses resulting from the opening and closing switch 152 decreases. Each time that the switch 152 opens, the circuit to the coil 120 will be completed; and when switch 152 is closed the circuit to coil 120 will be broken. If the cam 153 is rotating at high enough speed, the electrical reluctance will keep the switches 132 and 133 closed to maintain the circuit to the coils 120 and 121. When the speed of rotation of cam 153 has slowed down to a predetermined point, however, the frequency of the make and break of the switch arm 152 will have decreased so greatly that the electrical reluctance will not be able to maintain the circuit, after closing of arm 152, and the coils 120 and 121 will be deenergized. The cycle of operation will be, therefore, completed.

While the operation of the mechanism will be understood from the preceding description, it may be briefly summed up here. When the accelerator pedal 26 is released, the detent switch 44 may close. The initiator switch 71 will then respond to a change in the intake manifold vacuum and cause the governor 119 to become electrically energized when the intake manifold vacuum rises in response to a power absorption period. The moment the relay 120 of the governor is energized and the switch arms 132 and 133 are closed, the secondary relay coil 121 of the governor will be energized and the switch arms 134 and 135 will be closed. This completes the circuit to the solenoid 95. The solenoid 95 is thus energized and lifts the core-piece 98. This permits the chamber 109 (Figs. 6 and 7) of the sleeve 93 to be evacuated by the pull of vacuum in the engine through the intake manifold and the adapter 80. Air pressure on the lower side of the servo-piston 107 will then lift this piston into the magnetic field of the solenoid and this piston will be locked in its upper position by magnetic attraction. The moment the servo-piston leaves its seat on the Venturi tube 110, the chamber 111 in the hollow piston-valve 114 and the chamber 113 between the upper end of this valve and the casing 85 are evacuated through the adapter 80 and the intake manifold. The air pressure on the under side of the valve 114 then causes the valve to rise until it enters the magnetic field of the solenoid. Thereafter it is held in operative position as long as the apparatus is in operation. The fresh air is therefore sucked by the engine directly through the intake openings 87 in the housing 85 and through the filter 90 into the engine. This prevents formation of an unexploded explosive mixture in the engine, and prevents formation of fumes and all of the deleterious effects that ordinarily result when the engine is being driven.

To avoid vibration or chatter and switch breaker-point arcing, as each impulse is transmitted through the relay 121 to solenoid 95, capacitors 122 and 123 are provided.

The piston valve is held up until the governor breaks the solenoid circuit 95 of its own accord or the impulse circuit of the governor 119 is broken by the action of the detent switch 44 when there is a demand for power and the throttle is advanced by stepping on accelerator pedal 26.

At the end of the cycle of operation of the present device, the solenoid circuit is broken and the plunger valve 98 drops to close the port of the servo-piston 107 which in turn drops and closes the port of the main piston valve 114 which is pulled shut by the resulting drag of the flowing air currents and by its own weight. Thus, the return speed of the main piston valve 114 is governed by the force of spring 100 and the mass of the plunger valve 98, and the mass and clearances of the servo-piston 107 and the main piston 114. The venturi 110 assists in the evacuating when the apparatus begins to operate and it also assists gravity in closing the valve 114 at the end of the cycle of operation.

By adjusting the switch arms 132 and 133 of the governor, the point where the coils 120 and 121 are cut out can be adjusted. The governor is a conventional type relay and this adjustment can be made in conventional manner by varying pull-out pressure and magnetic air gaps. This point is preferably, as already stated, above the stalling point of the engine so as to insure against stalling the engine during operation of the device of the present invention.

To obtain the maximum economy in vehicle operation, the device should be adjusted to insure the quickest cut-in time and the latest drop-out time. Cut-in time is controlled by the initiator switch 71 and drop-out time is controlled by the governor 119.

The properly adjusted apparatus will not operate if the engine is cold and partially choked. A partially-applied choke opens the carburetor slightly and the engine will not achieve its normal vacuum. Thus the initiator switch 71 will not be closed to close the circuit to the apparatus of this invention.

The entire apparatus is, of course, inactive during power production. The apparatus is not energized or made active until the intake manifold pressure is sufficiently great to close the vacuum-operated and responsive switch 71.

The control of the device of the present invention is through magnetic relays 120 and 121 which are acted on by the electrical impulses causes by the opening and closing of the ignition breaker points 152. These impulses increase in frequency or decrease in frequency in direct relation to the engine speed. Hence, the "dropout" or "anti-stall" point of the apparatus can be controlled directly by the impulses generated by the ignition system. Since the vacuum or initiator switch 71 provides the means for determining when the apparatus will operate, the device will only cut in when the manifold pressure reaches the pre-determined level. Hence, the old fault of sensitive throttle control is completely removed.

Ignition damping through resistance 169 is a feature of the apparatus of the invention. Its purpose is to prevent unwanted acceleration when the valve becomes operative.

The apparatus of the present invention is relatively insensitive and has a wide latitude. It is relatively cheap. The parts from which it may be made are light and it can function under high intake manifold conditions. It is quiet and is easily adjustable.

While the invention has been described in connection with apparatus for use on an automotive engine, it is not limited to such use. It may be employed on any electrically ignited internal combustion engine including those of the semi-diesel type and including stationary engines, the detent switch in the last named case being operated upon movement of the control lever toward idling position.

In general, it may be said, then, that while the invention has been described in connection with a specific embodiment thereof, it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. The combination with the intake manifold of an internal combustion engine, an accelerator for the engine, an air-intake conduit for supplying air directly to the manifold, and a valve in said conduit, which when closed shuts off the direct air supply, of means for controlling the position of said valve, and means connecting the accelerator with said means whereby upon movement of the accelerator toward idling speed and decrease of the engine speed to a predetermined point said control means is actuated to valve-opening position, and separate means operated upon reduction of the engine speed to a further point to actuate said means to valve-closing position.

2. The combination with the intake manifold of an internal combustion engine, an accelerator for the engine, an air-intake conduit for supplying air directly to the manifold, a valve in said conduit which when closed shuts off the air supply, and an ignition system for the engine, of means for controlling the position of said valve, and means connecting the accelerator with said means whereby upon movement of the accelerator toward idling speed and decrease of the engine speed to a predetermined point said control means is actuated to valve-opening position, and means connecting the ignition system to said control means whereby upon reduction of the engine speed to a further point, said valve closes.

3. The combination with the intake manifold of an internal combustion engine, an accelerator for the engine, an air-intake conduit for supplying air directly to the manifold, a valve in said conduit which when closed shuts off the direct air supply, said valve being movable to open position when there is a differential in pressure on its outer and inside surfaces, and an ignition system for the engine, of electrically operated means operable to expose the one surface of said valve to the vacuum generated by operation of the engine and the other surface of the valve to atmospheric pressure when the accelerator is moved toward idling speed and the engine speed has decreased to a predetermined point, said electrically operated means being so electrically connected to the ignition system that when the frequency of the impulses produced by the ignition system falls to a predetermined value said electrically operated means will be rendered inoperative whereupon said valve will close.

4. The combination with the intake manifold of an internal combustion engine, an air-intake conduit for supplying air directly to the manifold, and a valve in said conduit which when closed shuts off the direct air supply to the manifold, said valve being movable to open position when there is a differential in pressure on its outer and inner surfaces, said valve having a port in it through which one surface of the valve may be exposed to vacuum generated by the engine, an auxiliary valve closing said port and means operable when the engine speed falls to a predetermined point to open said auxiliary valve.

5. The combination with the intake manifold of an internal combustion engine, an air-intake conduit for supplying air directly to the manifold, and a valve in said conduit which when closed shuts off the direct air supply to the manifold, said valve being movable to open position when there is a differential in pressure on its outer and inner surfaces, said valve having a port in it through which one surface of the valve may be exposed to vacuum generated by the engine, an auxiliary valve closing said port and means operable when the engine speed falls to a predetermined point to open said auxiliary valve and separate means operated when the speed of the engine falls to a still lower predetermined point to close said auxiliary valve.

6. The combination with the intake manifold of an internal combustion engine, an air-intake conduit for supplying air directly to the manifold and a valve in said conduit which when closed shuts off the direct air supply to the manifold, said valve being movable to open position when there is a differential in pressure on its outer and inner surfaces, said valve having a port in it through which one surface of the valve may be exposed to the vacuum generated by the engine, an auxiliary valve closing said port, said auxiliary valve being also normally closed and movable to open position only when there is a differential in pressure on its outer and inner surfaces, said auxiliary valve also having a port in it through which one surface of the auxiliary valve may be exposed to the vacuum generated by the engine, a third valve normally closing the port in the auxiliary valve, and means operable when the engine speed falls to a predetermined point to open said third valve.

7. The combination with the intake manifold of an internal combustion engine, an air-intake conduit for supplying air directly to the manifold and a valve in said conduit which when closed shuts off the direct air supply to the manifold, said valve being movable to open position when there is a differential in pressure on its outer and inner surfaces, said valve having a port in it through which one surface of the valve may be exposed to the vacuum generated by the engine, an auxiliary valve closing said port, said auxiliary valve being also normally closed and movable to open position only when there is a differential in pressure on its outer and inner surfaces, said auxiliary valve also having a port in it through which one surface of the auxiliary valve may be exposed to the vacuum generated by the engine, a third valve normally closing the port in the auxiliary valve, and means operable when the engine speed falls to a predetermined point to open said third valve and separate means operated when the speed of the engine falls to a still lower predetermined point to close said third valve.

8. The combination with the intake manifold of an internal combustion engine, an air-intake conduit for supplying air directly to the manifold, a hollow piston-valve in said conduit which when closed shuts off direct air supply to the manifold, a chamber in which said valve is reciprocable, said valve being mounted to project far enough from said chamber in its closed position so that its outer surface is exposed to atmospheric pressure, said valve having a port therein, an auxiliary valve normally closing said port, and means operable when the speed of the engine falls to a predetermined point to open said auxiliary valve to permit the engine to evacuate said first-named valve and the chamber in which it moves whereby to open said first-named valve by the differential in pressure on its opposite sides.

9. The combination with the intake manifold of an internal combustion engine, an accelerator for the engine, an air-intake conduit for supplying air directly to the manifold, a hollow piston valve in said conduit which when closed shuts off direct air supply to the manifold, a chamber in which said valve is reciprocable, said valve being mounted to project far enough from said chamber in its closed position so that its outer surface is exposed to atmospheric pressure, said valve having a port therein, an auxiliary hollow piston valve normally closing said port, a chamber in which the auxiliary valve reciprocates, said auxiliary valve having a port therein, a valve for closing the last-named port, a solenoid for opening said valve, and means operable when the speed of the engine falls to a predetermined point upon movement of the accelerator toward idling speed to energize said solenoid to open said third valve to permit the engine to evacuate the second chamber whereby the auxiliary valve is opened by the differential in pressure on its opposite sides, thereby permitting the chamber in which the first-named valve reciprocates to be evacuated and permit the first-named valve to be opened by the differential in pressure on its opposite sides.

10. The combination with the intake manifold of an internal combustion engine, an accelerator for the engine, an ignition system for the engine, an air-intake conduit for supplying air directly to the manifold, a hollow piston valve in said conduit which when closed shuts off direct air supply to the manifold, a chamber in which said valve is reciprocable, said valve being mounted to project far enough from said chamber in its closed position so that its outer surface is exposed to atmospheric pressure, said valve having a port therein, an auxiliary hollow piston valve normally closing said port, a chamber in which the auxiliary valve reciprocates, said auxiliary valve having a port therein, a valve for closing the last-named port, a solenoid for opening said valve, means operable upon movement of the accelerator toward idling position and upon reduction of the speed of the engine to a predetermined point to energize said solenoid to open said third valve to permit the engine to evacuate the second chamber whereby the auxiliary valve may be opened by the differential in pressure on its opposite sides, thereby permitting the engine to evacuate the first chamber, whereby the first-named valve is opened, said ignition system being so connected electrically to said solenoid as to break the circuit to the solenoid when the engine speed falls to a still further predetermined point above idling speed.

11. The combination with the intake manifold of an internal combustion engine, an accelerator for the engine, an air intake conduit for supplying air directly to the manifold, and a valve for normally closing said conduit to shut off direct air supply to the manifold, of electrically operated means for controlling the position of said valve, comprising a switch operable upon movement of the accelerator toward idling position and a second vacuum-operated switch mounted on the intake manifold and operable when the vacuum created by the engine in its operation reaches a predetermined point.

12. The combination with the intake manifold of an internal combustion engine, an accelerator for the engine, an ignition system for the engine, an air-intake conduit for supplying air directly to the manifold, and a valve for normally closing said conduit to shut off direct air supply to the manifold, of electrically operated means for controlling the position of said valve, means for closing a circuit to said electrically operated means comprising a switch operable upon movement of the accelerator toward idling position, and a vacuum-operated switch mounted on the intake manifold and operable when the vacuum created by the engine in its operation reaches a predetermined point, said ignition system being wired into said circuit to break the circuit when the engine speed is reduced to a predetermined point above its idling speed.

13. The combination with the intake manifold of an internal combustion engine, an accelerator for the engine, and the ignition system of the engine, of a valve for admitting air to the engine, and means for operating said valve actuated by movement of the accelerator toward idling position from any operation position and by the vacuum created when the engine is not delivering power, and the frequency of the impulses of current in the ignition system falls to a predetermind point.

14. The combination with the intake manifold of an internal combustion engine, an accelerator for the engine, an air-intake conduit for supplying air directly to the manifold, and a hollow piston-valve for normally closing said conduit to shut off direct air supply to the manifold, of a chamber in which the valve is reciprocable, said chamber being closed at one end and having its other end closed by said valve, a casing within which the chamber is mounted, said casing having air inlet openings through which air may be admitted into the casing, said valve having a port therein, an auxiliary piston valve for closing said port, a chamber in which said auxiliary valve is reciprocable, said chamber being contained within said first piston valve, said auxiliary valve having a port therein, a solenoid-operated valve reciprocable in the second chamber and adapted to close the port of the auxiliary valve, a solenoid for opening the solenoid operated valve, and means operable on movement of the accelerator toward idling position and on creation of a predetermined vacuum in the intake manifold when the engine is not delivering power for energizing said solenoid.

15. The combination with the intake manifold of an internal combustion engine, an accelerator for the engine, an air-intake conduit for supplying air directly to the manifold, the ignition system for the engine, and a hollow piston-valve for normally closing said conduit to shut off direct air supply to the manifold, of a chamber in which the valve is reciprocable, said chamber being closed at one end and having its other end closed by said valve, a casing within which the chamber is mounted, an air filter mounted within said casing between the chamber and the casing, said casing having air inlet openings through which air may be admitted through said filter into the casing, said valve having a port therein, an auxiliary piston valve for closing said port, a chamber in which said auxiliary valve is reciprocable, said chamber being contained within said first piston valve said auxiliary valve having a port therein, a solenoid-operated valve reciprocable in the second chamber and adapted to close the port of auxiliary valve, a solenoid for opening the solenoid operated valve, and means operable on movement of the accelerator toward idling position and on creation of a predetermined vacuum in the intake manifold when the engine is not delivering power for energizing said solenoid, and means operable when the frequency of the impulses in the ignition system falls below a predetermined value to break the circuit to said solenoid.

16. The combination with the intake manifold of an internal combustion engine, a carburetor for the engine, and an accelerator for the engine, of an adapter mounted between the carburetor and the intake manifold and communicating with both, means for admitting air into the adapter, a valve for closing off communication between said means and the adapter, and means operable on movement of the accelerator toward idling position and on creation of a predetermined vacuum in the intake manifold when the engine is not delivering power for opening said valve.

17. The combination with the intake manifold of an internal combustion engine, an ignition system for the engine, an air inlet conduit for admitting air to the manifold, a valve in said conduit for controlling admission of air to the manifold, electrically operated means for operating said valve, means including a relay for actuating said electrically operated means, and a vacuum operated switch for shunting the relay into the ignition circuit whereby the circuit to said relay and to said electrically operated means is maintained until the frequency of the impulses in said circuit falls below a predetermined limit, said vacuum-operated switch being actuated when a predetermined vacuum is created in the intake manifold while the engine is not delivering power.

18. The combination with the intake manifold of an internal combustion engine, a carburetor for the engine, and an ignition system for the engine comprising a primary coil, a secondary coil and a breaker controlling the primary coil, of an air inlet conduit for admitting air to the manifold in by-pass of the carburetor, a valve for controlling said inlet, means for opening said valve, and means operable while said valve is open to provide a constant current supply to the primary coil of the ignition system.

19. The combination with the intake manifold of an internal combustion engine, a carburetor for the engine, and an ignition system for the engine comprising a primary coil, a secondary coil, and a breaker controlling the primary coil, of an air inlet conduit for admitting air to the manifold in by-pass of the carburetor, a valve for controlling said inlet, means for opening said valve automatically when the engine is caused to absorb power, and means operable while said valve is open to provide a constant current supply to the primary coil of the ignition system.

20. The combination with the intake manifold of an internal combustion engine, a carburetor for the engine, an ignition system for the engine comprising a primary coil, a secondary coil, and a breaker controlling the primary coil, an accelerator, an air intake conduit for supplying air directly to the manifold in by-pass of the carburetor, and a valve in said conduit which when closed shuts off the air supply, of electromagnetic means for assisting engine vacuum to open said valve, and means for actuating said electromagnetic means comprising two switches controlled by the accelerator and by vacuum in the engine, respectively, and means also controlled by said switches for providing a constant current supply to the primary coil of the ignition system while said valve is open.

GEORGE J. TABER.

REFERENCES CITED

The following references are of record in the file of this patent:

UNITED STATES PATENTS

| Number | Name | Date |
|---|---|---|
| 1,970,002 | Ericsson | Aug. 14, 1934 |
| 1,998,494 | Doering | Apr. 23, 1935 |
| 2,018,426 | Taber | Oct. 22, 1935 |
| 2,035,775 | Vander Veer | Mar. 31, 1936 |